United States Patent
Han et al.

(10) Patent No.: US 11,531,864 B2
(45) Date of Patent: Dec. 20, 2022

(54) ARTIFICIAL INTELLIGENCE SERVER

(71) Applicant: LG ELECTRONICS INC., Seoul (KR)

(72) Inventors: Jongwoo Han, Seoul (KR); Hangil Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 944 days.

(21) Appl. No.: 16/361,032

(22) Filed: Mar. 21, 2019

(65) Prior Publication Data

US 2019/0294954 A1  Sep. 26, 2019

Related U.S. Application Data

(60) Provisional application No. 62/645,813, filed on Mar. 21, 2018.

(30) Foreign Application Priority Data

Sep. 18, 2018 (KR) .......................... 10-2018-0111737

(51) Int. Cl.
  *G06E 1/00*   (2006.01)
  *G06E 3/00*   (2006.01)
  (Continued)

(52) U.S. Cl.
  CPC .......... *G06N 3/0454* (2013.01); *G05D 1/0088* (2013.01); *G06K 9/6257* (2013.01);
  (Continued)

(58) Field of Classification Search
  CPC ...... G06N 3/0454; G06N 3/08; G05D 1/0088; G06K 9/6257; G06K 9/6289; G06V 20/20;
  (Continued)

(56) References Cited

U.S. PATENT DOCUMENTS 9,671,777 B1   6/2017 Aichele et al.
2016/0086078 A1  3/2016 Ji et al.
(Continued)

FOREIGN PATENT DOCUMENTS

| KR | 1020160034814 | 3/2016 |
| KR | 1020170096971 | 8/2017 |
| KR | 1020170101455 | 9/2017 |

OTHER PUBLICATIONS

Korean Intellectual Property Office Application No. 10-2018-0111737, Office Action dated Mar. 3, 2020, 5 pages.
(Continued)

*Primary Examiner* — Charlotte M Baker
(74) *Attorney, Agent, or Firm* — Lee, Hong, Degerman, Kang & Waimey PC

(57) ABSTRACT

Disclosed is an artificial intelligence (AI) server. The AI server includes a communication unit configured to communicate with an AI device; and an AI unit configured to receive feature data from the AI device, wherein the received feature data is generated by the AI device by obtaining sensing data and compressing the sensing data while preserving a feature of the sensing data; and input the received feature data to a deep learning model to obtain second sensing data for use in a recognition model related to an AI function of the AI device.

17 Claims, 10 Drawing Sheets

(51) Int. Cl.
*G06G 7/00* (2006.01)
*G06N 3/04* (2006.01)
*G06K 9/62* (2022.01)
*G05D 1/00* (2006.01)
*G10L 15/16* (2006.01)
*G06V 20/20* (2022.01)

(52) U.S. Cl.
CPC ........... *G06K 9/6289* (2013.01); *G06V 20/20* (2022.01); *G10L 15/16* (2013.01)

(58) Field of Classification Search
CPC ........ G06V 10/82; G06V 20/10; G10L 15/16; G10L 15/00
USPC ............................................ 706/20; 700/259
See application file for complete search history.

(56) References Cited

U.S. PATENT DOCUMENTS

| | | |
|---|---|---|
| 2016/0096272 A1 | 4/2016 | Smith et al. |
| 2016/0210536 A1 | 7/2016 | Cho |
| 2017/0213156 A1 | 7/2017 | Hammond et al. |
| 2020/0197818 A1* | 6/2020 | Ma ......................... G06N 20/00 |
| 2021/0116907 A1* | 4/2021 | Altman ................. B60W 50/04 |

OTHER PUBLICATIONS

PCT International Application No. PCT/KR2019/003305, Written Opinion of the International Searching Authority dated Jun. 26, 2019, 8 pages.

* cited by examiner

FIG. 8A
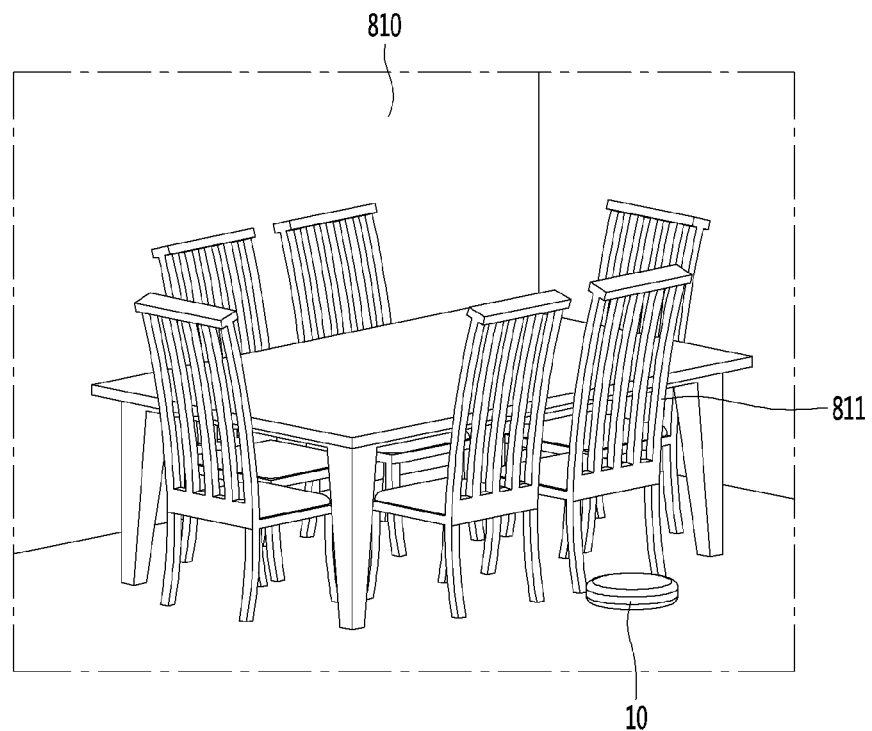
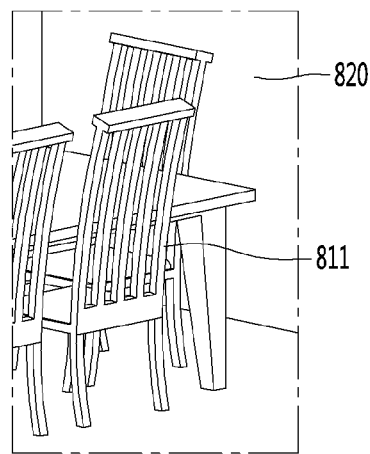

FIG. 9
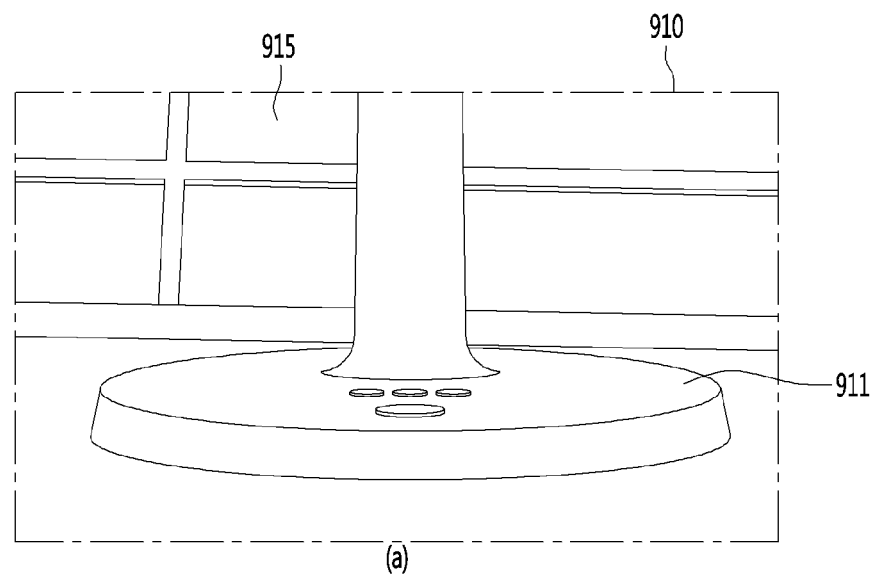
(a)
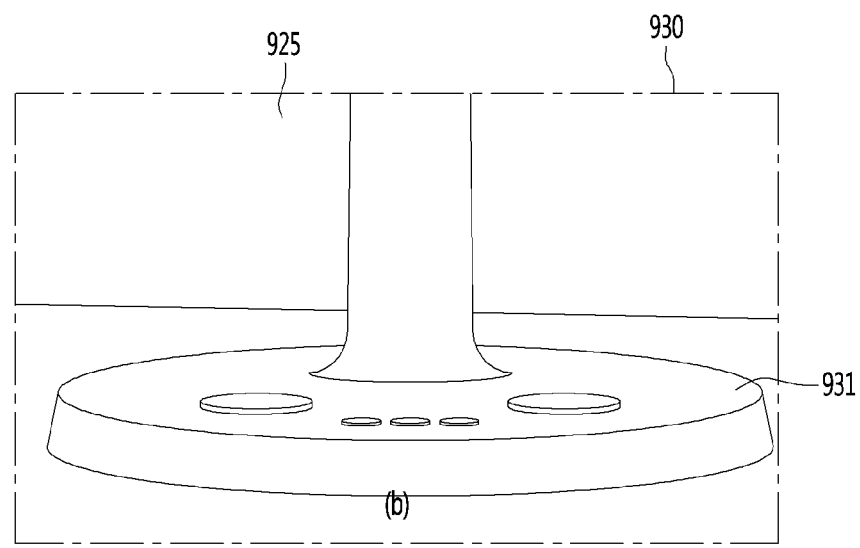
(b)

FIG. 10
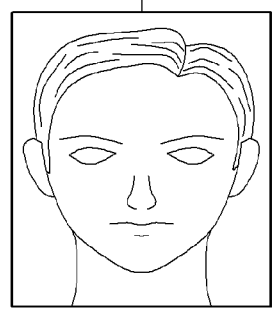
1010
1020
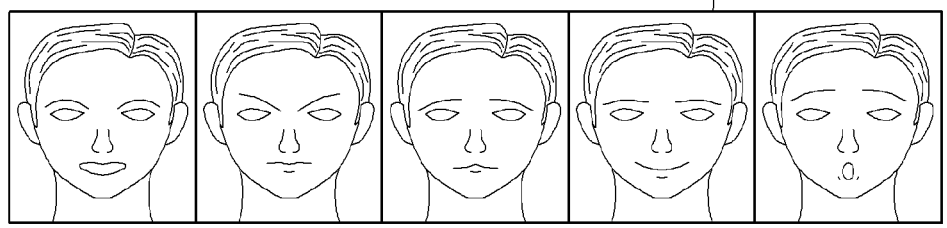

ARTIFICIAL INTELLIGENCE SERVER

CROSS-REFERENCE TO RELATED APPLICATIONS

Pursuant to 35 U.S.C. § 119, this application claims the benefit of earlier filing date and right of priority to Korean Application No(s). 10-2018-0111737, filed on Sep. 18, 2018, and also claims the benefit of U.S. Provisional Application No. 62/645,813, filed on Mar. 21, 2018, the contents of which are all incorporated by reference herein in their entirety.

BACKGROUND

Field of the Invention

The present invention relates to an artificial intelligence server or other terminal which receives feature data of a feature extracted from sensing data and obtains second sensing data similar to the sensing data by using the feature data.

Discussion of the Related Art

Artificial intelligence (AI) is in the field of information technology and computer engineering for researching a method of allowing a computer to perform learning and self-development to imitate intelligent behavior of humans. Moreover, AI is indirectly and directly associated with the field of computer engineering. Particularly, an AI component is applied to various fields of information technology, and attempts to solve problems in the field are being very actively pursued.

Research is being actively done on technology for recognizing and learning surroundings with AI and providing information desired by a user in a desired form or performing an operation or a function desired by the user.

A recognition model recognizes and learns a characteristic of a user of an AI device or a new environment to update the recognition model.

For example, when an AI device is a voice recognition enabled air conditioner and a recognition model of the AI device is a voice recognition model, the AI device may learn an utterance habit of an utterer to correct the voice recognition model, thereby performing utterer adaption.

As another example, when an AI device is a robot cleaner and a recognition model of the AI device is a topography recognition model, the AI device may correct the topography recognition model so as to be suitable for obstacles and a home space, thereby performing adaption on a space.

In such a process, it is important to learn the reason for recognition failure.

For example, when voice recognition fails due to a specific intonation, AI may be used to learn the specific intonation, and thus, performance may be enhanced. Also, when an automatic cleaning function of an automatic cleaning robot is hindered by an obstacle, AI may be used to learn a position or a shape of the obstacle, and thus, performance may be enhanced.

Moreover, recognition models such as a voice recognition model and a topography recognition model are equipped in an AI device, but tasks such as learning of a new environment or a characteristic of a user is mainly performed by an AI server.

Therefore, when the AI device fails in recognition, the AI device transfers a cause of recognition failure to the AI server.

For example, when the AI device fails to recognize a face, the AI transfers a captured face image to the AI server, and when the AI device fails to recognize a voice, the AI device transfers the voice to the AI server. Also, when a cleaning robot collides with an obstacle, the AI device transfers an image of the obstacle to the AI server.

In such a process, however, privacy may be violated. In detail, since the AI server is managed and operated by a provider which provides an AI service, users of the AI device may avoid transmitting their faces, voices, and home images as-is.

For example, there may be a case where the AI device transmits an image of a user in a private or compromising situation, such as if the user is in a state of undress, to the AI server.

Therefore, it is required to develop a method for solving a problem of privacy violation while transferring information about recognition failure to a server to enhance the performance of a recognition model.

SUMMARY

An aspect of the present invention is directed to provide an artificial intelligence (AI) server which receives only feature data of a feature extracted from sensing data and obtains second sensing data similar to the sensing data by using the feature data.

To achieve these and other advantages and in accordance with the purpose of the disclosure, as embodied and broadly described herein, there is provided an artificial intelligence (AI) server including a communication unit configured to communicate with an AI device; and an AI unit configured to receive feature data from the AI device, wherein the received feature data is generated by the AI device by obtaining sensing data and compressing the sensing data while preserving a a feature of the sensing data; and input the received feature data to a deep learning model to obtain second sensing data for use in a recognition model related to an AI function of the AI device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 8A, 8B and 8C are diagrams for describing a method of obtaining second sensing data in a recognition service for autonomous movement; and FIGS. 9 and 10 are diagrams for describing a method of setting a condition to generate second sensing data.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1:
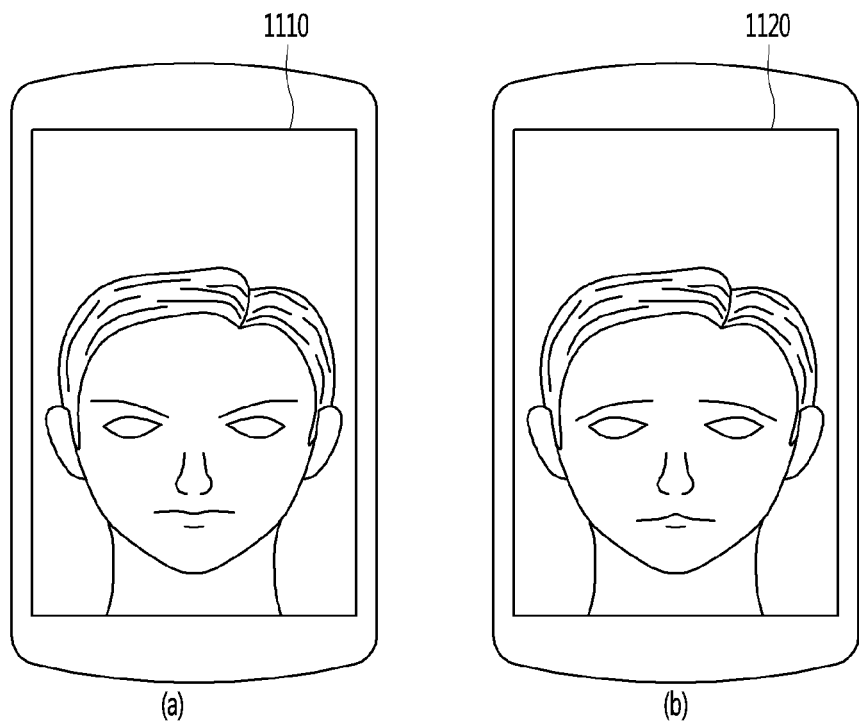
FIGS. 1 and 2 are diagrams of the related art.
Figure 2:
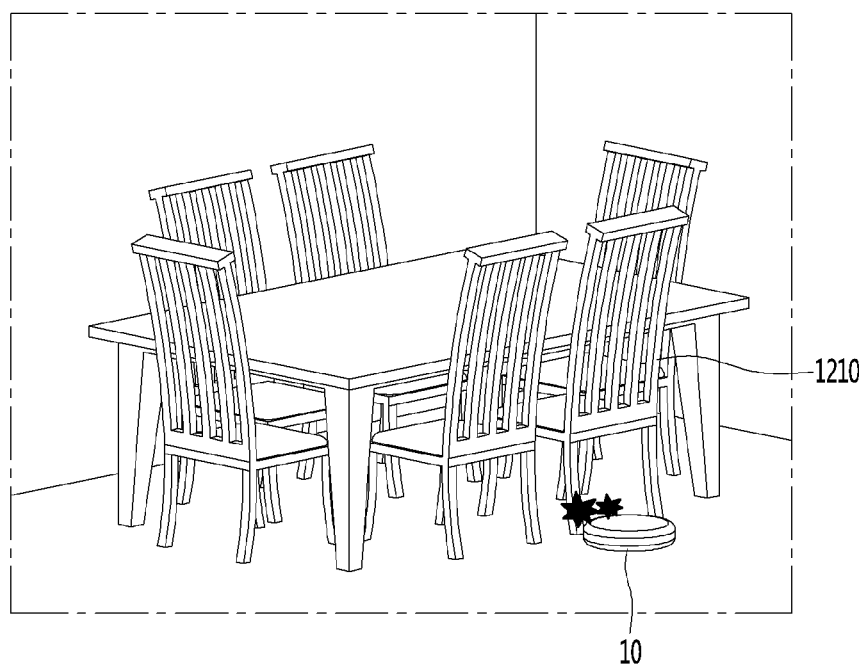

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. FIGS. 1 and 2 are diagrams for describing a problem of the related art.

FIG. 1A is an image which is initially registered by a user for face recognition, and FIG. 1B is an image of a user in a case where authentication is performed by using face recognition.

As illustrated in FIG. 1A, an image 1110 may be obtained by photographing an expressionless face of a user and may be registered. In this case, the image 1110 of FIG. 1A may be input to an image recognition model, and the image recognition model may extract a feature of a face of a user from the image 1110 of FIG. 1A, learn the extracted feature, and perform authentication.

Subsequently, when the user makes the same expression as an expression in FIG. 1A and attempts authentication, the image recognition model may very easily identify the user.

The user may focus a camera on a face thereof, for authentication. In this case, an image 1120 received by an AI device is illustrated in FIG. 1B.

Referring to FIG. 1B, a user is making an expression which differs from a registered image.

In this case, the image recognition model may not learn another expression of the user. Therefore, an accuracy of image recognition may be reduced, and it is unable to identify the user.

In this case, the image 1120 of FIG. 1B may be transmitted to an artificial intelligence (AI) server to allow an AI model to learn the image 1120, thereby enhancing the performance of the image recognition model. In this case, however, the face of the user or a background may be transmitted to the AI server as-is, and due to this, privacy may be violated.

FIG. 2 is a diagram illustrating a case where an object recognition service for autonomous movement fails.

An AI device 10 may be a cleaning robot which performs auto-cleaning, and a recognition model for autonomous movement may be equipped in the AI device 10.

In this case, the recognition model for autonomous movement may check an internal structure of a house and a position of an obstacle. Therefore, the cleaning robot may perform cleaning while moving without colliding with obstacles, walls, or the like.

However, in a case where the internal structure of the house or an obstacle is not learned, the cleaning robot may collide with an obstacle 1210. In this case, the recognition model may capture an image of a collided position and may learn a shape, a position, or the like of the obstacle 120.

However, since the learning is performed by the AI server, the cleaning robot may transmit the image of the collided position to the AI server. However, the image may include private or embarrassing material in the background or other portions of the image, such as underwear disheveled in the house or a nude photograph of an after-bath user. Therefore, when an image is transmitted to the AI server as-is, privacy may be violated.

Therefore, it is required to solve such a problem.

Figure 3:
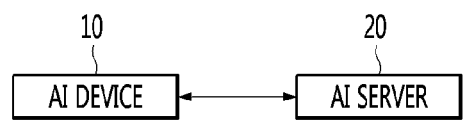
FIG. 3 is a diagram for describing an artificial intelligence (AI) system according to an embodiment of the present invention.

FIG. 3 is a diagram for describing an AI system according to an embodiment of the present invention.

Referring to FIG. 3, the AI system may include an AI device 10 and an AI server 20.

The AI device 10 may communicate with the AI server 20. In detail, the AI device 10 may include a communication unit, for example a hardware communication unit such as a wired or wireless modem, wireless radio hardware, transceiver, or the like, and the communication unit may provide an interface for connecting an electronic device to a wired/wireless network including the Internet network. The communication unit may transmit or receive data to or from the AI server 20 over an accessed network or another network linked to the accessed network.

The AI device 10 may be equipped with a recognition model for providing an AI service.

Here, the recognition model may denote a model implemented by hardware and software that applies machine learning technology such as an artificial neural network (ANN) to learn using massive amounts of information, and thus, is trained to provide the AI service.

For example, when the AI service provided by the AI device 10 is a voice recognition service, the recognition model may provide the voice recognition service which construes a voice signal of a user to combine the construed voice signal with a patterned database, thereby converting a voice signal into a character string or identifying linguistic meaning content.

As another example, when the AI service is an image recognition service, the recognition model may provide the image recognition service which construes an image signal to identify or distinguish an object included in an image.

As another example, when the AI service is a recognition service for autonomous movement, the recognition model may provide a service which construes an image signal to check an internal structure and a position of an obstacle or the like and allows the AI device to move without collision.

The AI device 10 may obtain sensing data for providing the AI service.

For example, the AI device 10 may include a sensing unit. Also, when the AI service provided by the AI device 10 is a voice recognition service, the sensing unit may receive voice data through a microphone.

As another example, when the AI service is an image recognition service or a recognition service for autonomous movement, the sensing unit may receive image data through a camera.

The AI device 10 may provide the AI service by using obtained sensing data.

In detail, the AI device 10 may input the sensing data to the recognition model and may provide the AI service according to an output value which is output by the recognition model, based on the input sensing data.

The AI device 10 may generate feature data obtained by extracting a feature from the obtained sensing data and may transmit the generated feature data to the AI server 20.

The AI device 10 may include a deep learning model, for generating the feature data including the feature extracted from the obtained sensing data. Here, the deep learning model may be an encoder of a variational auto-encoder (VAE).

The AI server 20 may communicate with the AI device 10. In detail, the AI server 20 may include a communication unit, and the communication unit may provide a hardware and/or software interface for connecting an electronic device to a wired/wireless network including the Internet network. The communication unit may transmit or receive data to or from the AI server 20 over an accessed network or another network linked to the accessed network.

The AI server 20 may update the recognition model equipped in the AI device 10.

In detail, the AI server 20 may receive the feature data, obtained by extracting the feature from the sensing data, from the AI device 10. Also, the AI server 20 may input the feature data to the deep learning model to obtain second sensing data.

Here, the deep learning model may be a decoder of the VAE or a generator of a generative adversarial network (GAN).

In this case, the AI server 20 may train the recognition model by using the second sensing data. Also, the AI server 20 may transmit the trained recognition model to the AI device 10.

In this case, the AI device 10 may receive the trained recognition model and may change a previous recognition model to the trained recognition model by replacing stored programming code of the previous recognition model with the trained recognition model, such that any additional sensing data will be processed and the AI service provided using the newly received trained recognition model.

Figure 4:
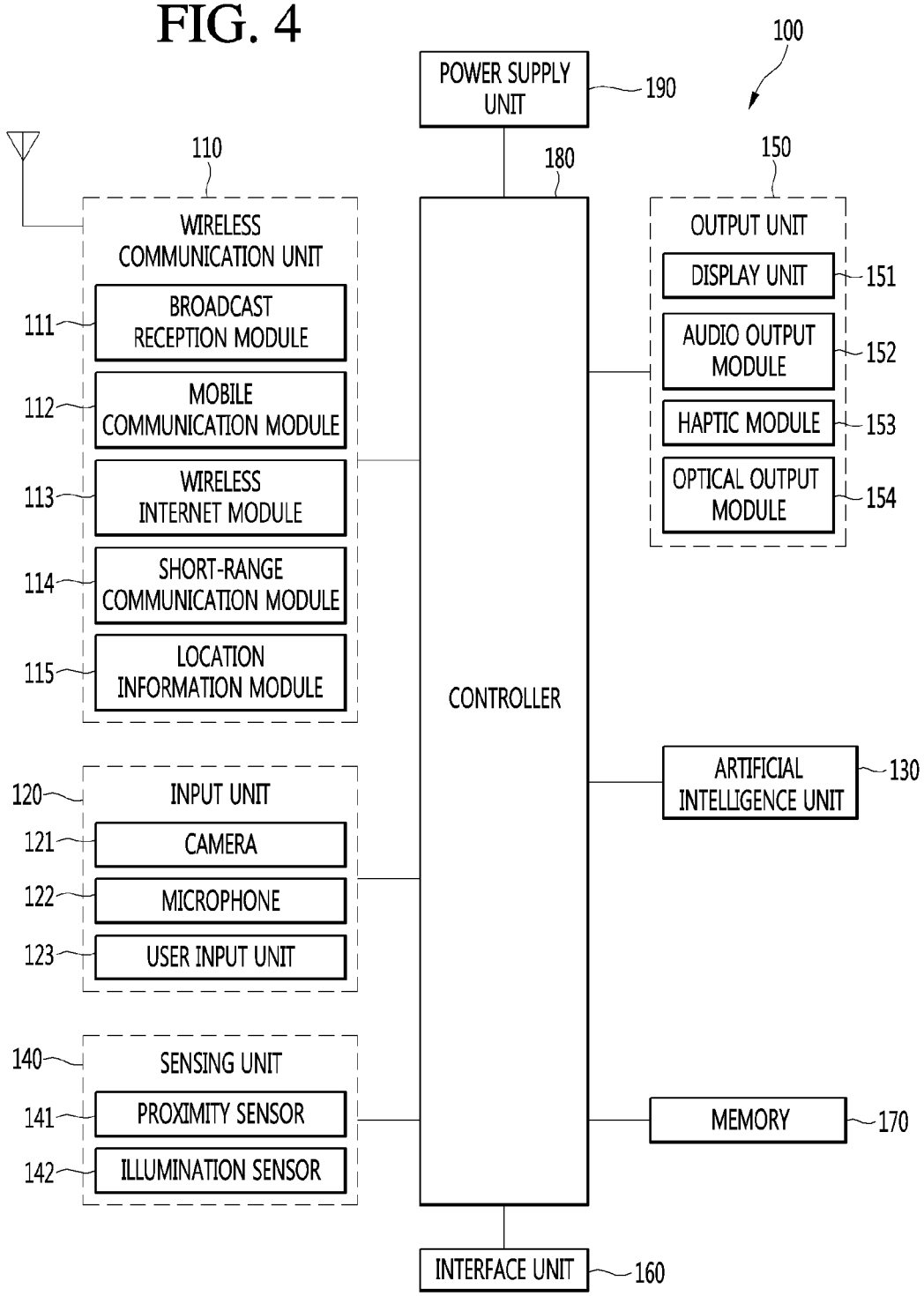
FIG. 4 is a block diagram for describing a mobile terminal available as an AI device of the present invention.

FIG. 4 is a block diagram for describing a terminal corresponding to the AI device 10 in some embodiments of the present disclosure.

The terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. It will be further understood that these components may correspond to software or hardware for implementing each component.

Referring now to FIG. 4, a terminal 100 of the present disclosure may include a wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115. Those of ordinary skill will understand that the wireless communication unit may be implemented as hardware components, such as a modem, a radio, antenna system, system on chip for wireless communication, and the like.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

An artificial intelligence unit 130 is responsible for processing information based on artificial intelligence technology and may include one or more modules for performing at least one of learning of information, inference of information, perception of information and processing of a natural language.

The artificial intelligence unit 130 may perform at least one of learning, inference and processing of vast amounts of information (big data) such as information stored in the mobile terminal, surrounding environmental information of the mobile terminal and information stored in a communicable external storage. In addition, the artificial intelligence unit 130 may control the mobile terminal to predict (infer) executable operation of at least one mobile terminal and to perform most feasible operation of the at least one predicted operation, using the information learned using the machine learning technology.

The machine learning technology refers to technology of collecting and learning a large amount of information based on at least one algorithm and determining and predicting information based on the learned information. Learning of information refers to operation for grasping the characteristics, rules and criteria of judgement of the information, quantifying a relationship between information and information, and predicting new data using a quantified pattern.

An algorithm used by such machine learning technology may be a statistical based algorithm and may include, for example, a decision tree using a tree structure as a prediction model, an artificial neural network for emulating the neural network structure and function of an organism, genetic programing based on biological evolutionary algorithms, clustering for distributing observed examples into subsets such clusters, and a Monte-Carlo method of calculating the probability of a function value through a randomly extracted number, and the like.

As a field of machine learning technology, one example of deep learning technology includes performing at least one of learning, determining and processing of information using an artificial neural network algorithm. The artificial neural network may have a structure including an input layer, numerous hidden layers, and an output layer. Such deep learning technology may learn vast amounts of information through an artificial neural network using a graphic processing unit (GPU) optimized for parallel computation.

Meanwhile, the artificial intelligence unit 130 may collect (sense, monitor, extract, detect or receive) signals, data, information, etc. input to or output from the components of the mobile terminal in order to collect vast amounts of information for applying machine learning technology. In addition, the artificial intelligence unit 130 may collect (sense, monitor, extract, detect or receive) data, information, etc. stored in an external storage (e.g., a cloud server) connected through communication-enabling hardware and software. More specifically, collection of information may be understood as including sensing of information through a sensor, extraction of information stored in the memory 170, or reception of information from the external storage through communication-enabling components.

The artificial intelligence unit 130 may sense information at the mobile terminal, surrounding environment information of the mobile terminal and user information through various other components, such as the sensing unit 140. In addition, the artificial intelligence unit 130 may receive a broadcast signal and/or broadcast related information, wireless signal, wireless data, etc. through the wireless communication unit 110. In addition, the artificial intelligence unit 130 may receive image information (or signal), audio information (or signal), data or information via the camera or input by a user from the input unit.

The artificial intelligence unit 130 may collect vast amounts of information in real time, process the information, and store information processed in an appropriate form (e.g. knowledge graph, command policy, personalization database, dialog engine, etc.) in the memory 170.

In addition, when operation of the terminal is predicted based on the information learned using the machine learning technology, the artificial intelligence unit 130 may control the components of the mobile terminal and send a control command for executing the predicted operation to the controller 180, in order to execute the predicted operation. The controller 180 may control the mobile terminal based on the control command to execute the predicted operation.

Meanwhile, when a specific operation is performed, the artificial intelligence unit 130 may analyze history information indicating performing of the specific operation using machine learning and update existing learned information based on the analyzed information. Therefore, the artificial intelligence unit 130 may improve information prediction accuracy.

The artificial intelligence unit 130 and the controller 180 may be understood as the same component. In this case, the function performed by the controller 180 described in this specification may be described as being performed by the artificial intelligence unit 130, and the controller 180 may be referred to as the artificial intelligence unit 130 or the artificial intelligence unit 130 may be referred to as the controller 180.

Alternatively, the artificial intelligence unit 130 and the controller 180 may be understood as different components. In this case, the artificial intelligence unit 130 and the controller 180 may perform a variety of control on the terminal through data exchange. The controller 180 may perform at least one function on the mobile terminal based on a result derived from the artificial intelligence unit 130 or control at least one of the components of the mobile terminal. Further, the artificial intelligence unit 130 may operate under control of the controller 180, or in other cases they may operate independently.

The sensing unit 140 is typically implemented using one or more sensors configured to sense internal or external information of the mobile terminal, the surrounding environment of the mobile terminal, user information, and the like. For example, in FIG. 4, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 may include a display unit 151, an audio output module 152, a haptic module 153, and an optical output module 154, including hardware implementations, for example a display, a speaker, haptic feedback providing hardware, and the like.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 4, or activating application programs stored in the memory 170. As one example, the controller 180 controls some or all of the components illustrated in FIG. 2 according to the execution of an application program that have been stored in the memory 170. The controller 180 may correspond to hardware implementations such as one or more central processing units, and the like.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 4, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112. The wireless internet module 113 may be, for example, a hardware radio or modem configured with the above capabilities.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks. The short range communication module 114 may be, for example, a hardware radio or modem configured with the above capabilities.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. The location information module 115 may be, for example, a hardware GPS radio or antenna configured with the above capabilities.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The input unit 120 and the sensing unit 140 are described as separate elements, but without being limited thereto, the sensing unit 140 may include the input unit 120.

The AI device 10 may include elements of the terminal 100 and may perform a function performed by the terminal 100.

Figure 5:
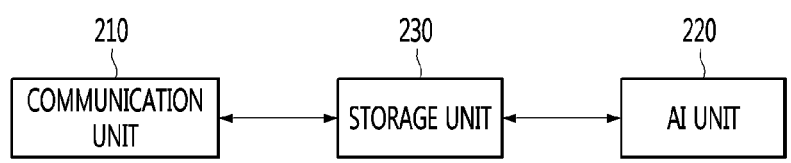
FIG. 5 is a block diagram for describing an AI server according to an embodiment of the present invention.

FIG. 5 is a block diagram for describing an AI server 20 according to an embodiment of the present invention.

The AI server 20 may include a communication unit 210, which may include hardware or software similar to the wireless communication unit 110 of the terminal 100 discussed in FIG. 4, an AI unit 230, which may include hardware or software similar to the AI unit 130 discussed in FIG. 4, and a storage unit 220, which may include hardware or software similar to the memory 170 discussed in FIG. 4. However, the disclosure is not limited thereto, and the communication unit 210, AI unit 230, and storage unit 220 may be implemented using different hardware and/or software than those discussed with respect to terminal 100.

The communication unit 210 may communicate with an external device.

In detail, the communication unit 210 may be connected to the AI device 10 via a wired or wireless connection and may transmit or receive data to or from the AI device 10 according to control by the AI unit 230.

The AI unit 230 may receive feature data from the AI device 10 through the communication unit 210 and may generate second sensing data corresponding to the received feature data by using a deep learning model.

Moreover, the AI unit 230 may train a recognition model by using the second sensing data and may transmit the trained recognition model to the AI device 10 through the communication unit 210.

The storage unit 220 may store a program related to the deep learning model and a program corresponding to the recognition model.

In the present specification, the storage unit 220 may be referred to as a memory.

Moreover, in the present specification, the AI unit 230 may be referred to as an AI controller, or may be referred to as an AI processor.

Figure 6:
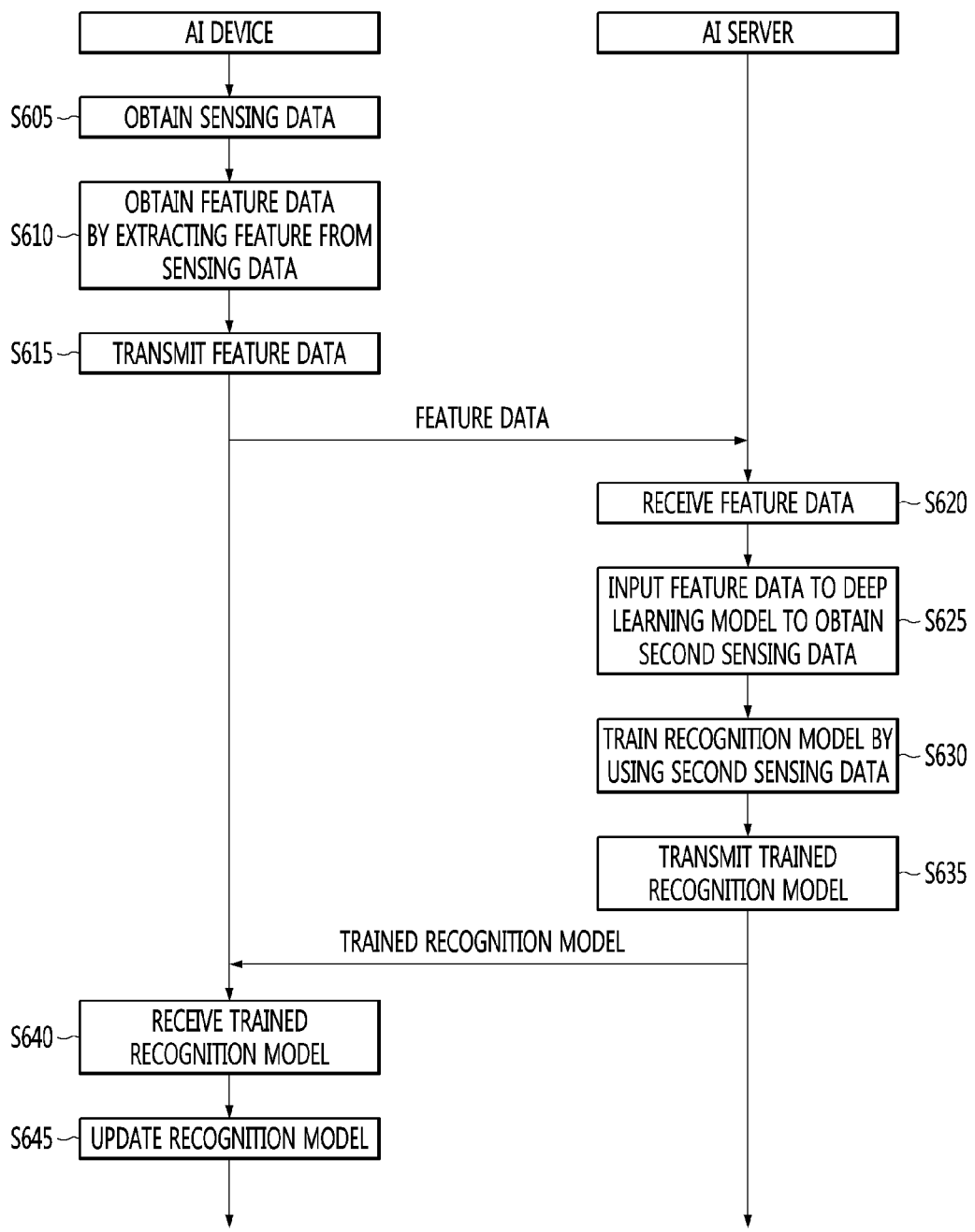
FIG. 6 is a diagram for describing an operating method of an AI system according to an embodiment of the present invention.

FIG. 6 is a diagram for describing an operating method of an AI system according to an embodiment of the present invention.

Figure 7:
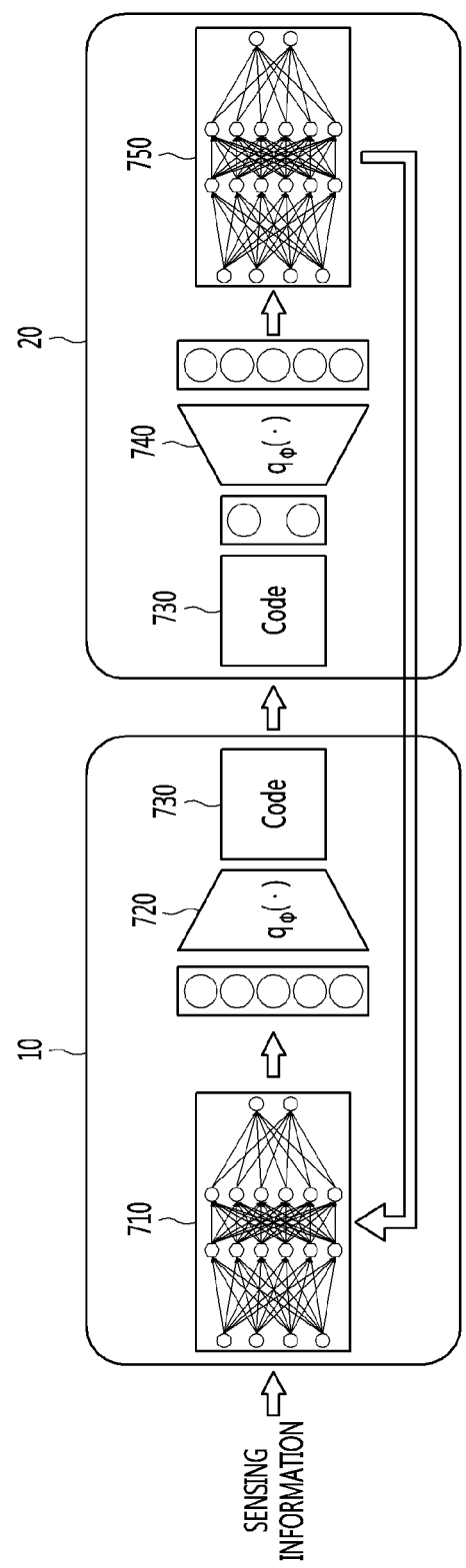
FIG. 7 is a diagram for describing a process of extracting feature data from sensing data, obtaining second sensing data by the feature data, and updating a recognition model, according to an embodiment of the present invention.

FIG. 7 is a diagram for describing a process of extracting feature data from sensing data, obtaining second sensing data by the feature data, and updating a recognition model, according to an embodiment of the present invention.

The following description will be given with reference to FIGS. 6 and 7.

In step S605, the AI device 10 may obtain sensing data through the sensing unit 140.

Here, the sensing data may be data which is obtained for providing the AI service by the AI unit 130.

For example, when the AI service is a voice recognition service, the AI unit 130 may obtain voice data through the microphone 122.

As another example, when the AI service is an image recognition service or a recognition service for autonomous movement, the AI unit 130 may obtain image data through the camera 121.

The AI unit 130 may execute the voice recognition service by using the received sensing data.

In detail, the AI unit 130 may input the sensing data to the recognition model 710, such as a neural network and the like as discussed further below, and may provide the AI service by using a recognition result output from the recognition model 710.

For example, when the AI service is the voice recognition service, the recognition model 710 may output information about a meaning of a word included in a voice. In this case, the AI unit 130 may perform a function corresponding to the word.

As another example, when the AI service is the image recognition service, the recognition model 710 may output an identification result of an object included in an image. In this case, the AI unit 130 may determine authentication success or authentication failure, based on the identification result and may perform an operation based on the authentication success or the authentication failure.

As another example, when the AI service is the recognition service for autonomous movement, the AI unit 130 may output an identification result of an object included in an image. In this case, the AI unit 130 may set movement path of the AI device 10, based on the identification result.

In step S610, the AI unit 130 may obtain feature data obtained by extracting a feature from the sensing data.

In this case, when the AI unit 130 fails to perform the AI service based on the sensing data, the AI unit 130 may obtain the feature data obtained by extracting the feature from the sensing data.

For example, in a case where the AI service is the voice recognition service, when the AI unit 130 cannot output the information about the meaning of a word included in the voice, the AI unit 130 may generate the feature data obtained by extracting the feature from the sensing data.

As another example, in a case where the AI service is the image recognition service, when authentication fails due to the reduction in accuracy of the identification result of the object, the AI unit 130 may generate the feature data obtained by extracting the feature from the sensing data.

As another example, in a case where the AI service is the recognition service for autonomous movement, a movement path may be set based on an identification result of a recognition model, and when collision occurs while movement is being performed along the movement path, the AI unit 130 may generate the feature data obtained by extracting the feature from the sensing data.

Here, the feature to be extracted from the sensing data may be information which affects success or failure in providing the AI service.

For example, when the AI service is the voice recognition service and an intonation, a speed, and sex of an utterer affects success or failure in providing the AI service, the feature to be extracted from the sensing data may include an expression of a user.

As another example, when the AI service is the recognition service for autonomous movement and an illuminance of an image, a position of an object, a color of the object, a shape of the object, a direction of the object, or a relationship between the object and a background affects success or failure in providing the AI service, the feature to be extracted from the sensing data may include at least one of the illuminance of the image, the position of the object, the color of the object, the shape of the object, the direction of the object, and the relationship between the object and the background.

Hereinafter, a method of generating the feature data obtained by extracting the feature from the sensing data will be described by using a VAE.

A brief overview of a VAE will be discussed herein, however it will be understood by those of ordinary skill in the art that variations of the disclosure including other forms of data processing and generation may be similarly applied for the purposes of this disclosure. The VAE may include an encoder 710 and a decoder 740.

In the VAE, input data may pass through an input layer and may enter a hidden layer. In this case, the number of nodes of the hidden layer may be smaller than the number of nodes of the input layer, and thus, a dimension of data may be reduced, whereby compression or encoding may be performed.

Moreover, in the VAE, data output from the hidden layer may enter an output layer. In this case, the number of nodes of the output layer may be smaller than the number of nodes of the hidden layer, and thus, a dimension of data may increase, whereby decompression or decoding may be performed.

A process of encoding data may be performed by the encoder 710, and a process of decoding data may be performed by the decoder 740. In the present invention, the encoder 720 may be equipped in the AI device 10, and the decoder 740 may be equipped in the AI server 20.

If the principle of the VAE is applied to the present invention, the sensing data may be input to the encoder 720 of the AI device 10. In this case, the encoder 720 may compress the sensing data while maintaining the above-described feature.

Data, obtained by compressing, removing, or otherwise abstracting other aspects of the sensing data while maintaining the feature of the sensing data, may be referred to as feature data 730. In this case, the feature data may be represented by a code, and the code may include information representing the maintained feature.

In step S615, the AI unit 130 of the AI device 10 may transmit the generated feature data to the AI server 20.

In step S620, the AI server 230 of the AI server 20 may receive the feature data which has the feature of the sensing data and is generated by compressing the sensing data obtained for providing the AI service.

Moreover, the AI unit 230 may input the feature data to the decoder 740 of the VAE.

In this case, the decoder 740 may generate second sensing data from the feature data.

In detail, the decoder 740 may be in a state where the decoder 740 has been trained based on a large amount of data included in a training database. Also, the decoder 740 may decode the feature data to generate the second sensing data.

In this case, the second sensing data may include a feature included in the sensing data, but may be data which differs from the sensing data.

For example, sensing data generated in the AI service may be a face image including a smiling expression of a user A. Also, feature data may be a code including information about an expression, but the second sensing data generated from the feature data may include a smiling expression but may be a face image from which the user A is not identified.

As another example, in the voice recognition service, sensing data may be a voice including a dialect intonation of the user A. Also, feature data may be a code including information about the dialect intonation. Also, second sensing data generated from the feature data may include a dialect intonation but may be a voice which differs from a voice of the user A.

The decoder 740 may generate the second sensing data from the feature data and corresponding data included in the database.

Here, generating the second sensing data may include outputting the second sensing data where the decoder 740 decodes the sensing data.

Data included in the database may include data included in the training database (i.e., data pre-learned by the decoder 740). However, the present embodiment is not limited thereto. In other embodiments, data included in the database may include data which differs from data pre-learned by the decoder 740.

Data corresponding to the feature data may denote data similar to the feature data.

In an embodiment, the feature data may include information, representing a feature of a user, and other information.

For example, in the voice recognition service, feature data may include information for determining a feature (an intonation, a speed, and sex of a voice), and moreover, may include a phoneme, a syllable, a linguistic meaning of voice data, a pitch of a voice, and other characteristics of the voice.

In this case, the decoder 740 may select data similar to the feature data from among the pieces of data included in the database and may generate the second sensing data from the selected data and the feature data. In some embodiments, the second sensing data may include an abstracted version of the feature among the feature data, or include an alternate representation of the feature among the feature data.

For example, the sensing data may include a characteristic of a voice of the user A, such as the intonation of a Gyeongsangnam-do or other region-specific dialect of the user A, a spoken words of the voice such as "turn on the television", and a pitch of the voice.

In this case, the decoder 740 may select data from the database having a characteristic which is the most similar to the characteristic of the voice of the user A. Also, the decoder 740 may generate a voice saying the words "turn on the television" which is a voice similar to the voice of the user A and to which the intonation of the Gyeongsangnam-do or other region-specific dialect is applied, based on the selected data and the feature data.

In this case, when the database stores data having a same characteristic as that of the voice of the user A (i.e., when the database stores data of the voice of the user A), the decoder 740 may select data having the same characteristic. For example, the decoder 740 may generate a voice saying the words "turn on the television" which is a voice similar to the voice of the user A and to which the intonation of the Gyeongsangnam-do or other region-specific dialect is applied.

In another embodiment, a recognition service for autonomous movement will be described as an example.

Referring to FIG. 8A, a robot cleaner 10 has collided with a chair 811 in a room 810.

In this case, the robot cleaner 10 may generate feature data obtained by compressing sensing data 820 (a captured image) and may transmit the generated feature data to an AI server. In this case, the feature data may include information such as a position of the chair 811, a shape of the chair 811, and a direction of the chair 811.

Figure 8B:
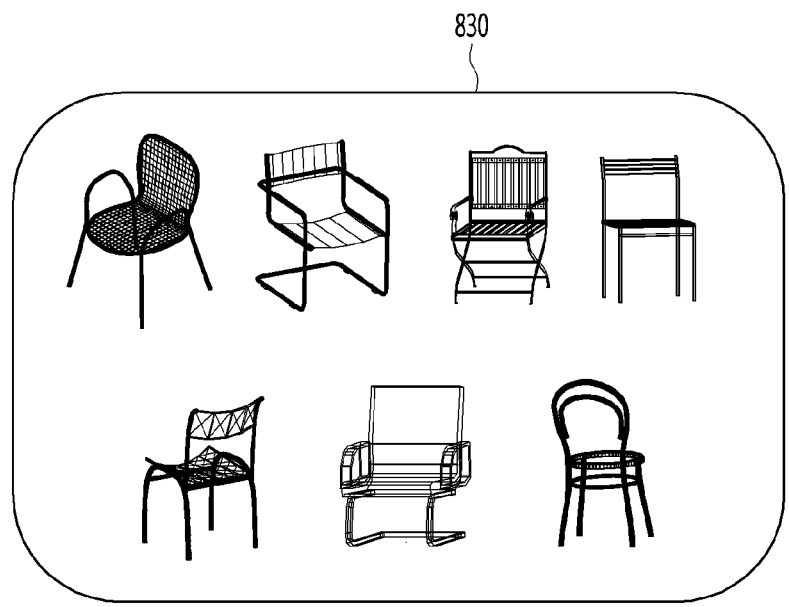

Referring to FIG. 8B, data of various chairs may be stored in a database 830.

In this case, the AI server 20 may compare a code of the feature data with codes of the data included in the database 830 to select a chair which is the most similar in position, shape, and direction of the chair 811, from among the various chairs.

Figure 8C:
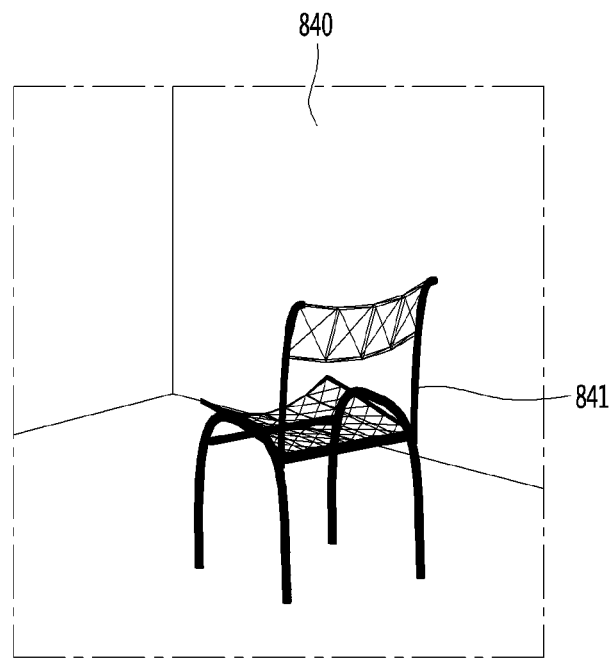

Moreover, as illustrated in FIG. 8C, the AI server 20 may generate second sensing data 840 including a representation of the chair 811 in the form of chair 841 which is not the same as the chair 811 included in the sensing data but is similar in position, shape, and direction.

An example of generating the second sensing data by using the VAE has been described above, but the present embodiment is not limited thereto.

In detail, an AI unit of the AI server may input feature data to a deep learning model to obtain the second sensing data. In this case, the deep learning model may be a generator of a generative adversarial network (GAN).

The GAN may be a machine learning method for improving performance through competition between two different AIs (for example, the generator and a discriminator).

In this case, the generator may be a model which creates new data and may generate a new image, based on original data, and the discriminator may be a model which recognizes a pattern of data and may check the truth or not of an image, based on the original data.

Moreover, the discriminator may evolve to discriminate the original image and a generated (or falsified) image, and the generator may evolve to deceive the discriminator as well as possible, thereby evolving the performance of the discriminator and the performance of the generator.

In an embodiment of the present disclosure, the deep learning model for generating the second sensing data may be the generator of the GAN.

In detail, a generator included in the AI server 20 may generate the second sensing data, based on feature data.

For example, when feature data includes a smiling expression of user A, the generator included in the AI server 20 may generate second sensing data including a smiling expression, based on the feature data. Also, the generator included in the AI server 20 may select data similar to the feature data from a database to generate the second sensing data.

The AI unit 230 may set various conditions of the deep learning model to generate the second sensing data.

For example, referring to FIG. 9, a robot cleaner has collided with an electric fan 911 in a room.

In this case, the robot cleaner may generate feature data obtained by compressing sensing data 910 (a captured image) and may transmit the generated feature data to an AI server. In this case, the feature data may include information such as a position, a shape, and the like of the electric fan.

Data of various images including the electric fan may be stored in a database.

In this case, the AI server 20 may compare a code of the feature data with codes of the data included in the database to select data of an image 930 including an electric fan 931 which is similar in position and shape of the electric fan 911.

In this case, when the feature data is decoded without condition, a background of the electric fan 931 may be randomly generated.

The AI unit 230 may set a condition of the background to generate second sensing data 930 including a specific background 925 and the electric fan 931.

As another example, referring to FIG. 10, second sensing data 1010 including a specific expression may be generated by decoding feature data.

In this case, the AI unit 230 may set, as conditions, various expressions such as an angry expression, a crying expression, and a smiling expression and may generate pieces of second sensing data 1020 of various expressions.

Referring again to FIGS. 6 and 7, in step S630, the AI unit 230 may train a recognition model 750 for providing an AI service based on the second sensing data.

In detail, the AI unit 230 may provide the second sensing data as training data to train the recognition model 750. In this case, the recognition model 750 may learn a feature.

For example, in the voice recognition service, the recognition model 750 may learn an intonation of a region-specific dialect such as a Gyeongsangnam-do dialect by using the second sensing data.

As another example, in a face or image recognition service, the recognition model 750 may learn a smiling expression by using the second sensing data.

As another example, in a recognition service for autonomous movement, the recognition model 750 may learn a position of an obstacle, a size of the obstacle, and a shape of the obstacle in an indoor space, based on the second sensing data.

Referring back to FIG. 6, in step S635, the AI unit 230 may transmit the trained recognition model to the AI device 10.

In steps S640 and S645, the AI unit 130 of the AI device 10 may receive the trained recognition model and may update a recognition model of the AI device 10.

In detail, the AI device 10 may change a previous recognition model to the trained recognition model by replacing stored programming code of the previous recognition model with the trained recognition model, such that any additional sensing data will be processed and the AI service provided using the newly received trained recognition model.

According to embodiments of the present disclosure, a feature may be required for learning and training a data model, but all information collected may not necessarily be required. For example, in an image, illuminance, a position, color, and direction of an object, and a relationship between the object and a background may be utilized, but identification of what the object actually is may not be needed.

Thus, in the present disclosure, feature data which maintains one or more features needed for learning may be transmitted instead of transmitting all sensed data to a server. Also, second sensing data generated by decoding the feature data may include information needed for learning and may be data which differs from first sensing data in that alternate representations or abstracted versions of one or more features are included along with the other feature data.

For example, when a private photograph of a user in a state of undress is included in sensing data and is transmitted, the image of the undressed user may be replaced by an image of another person shown in a flesh color or other generic and/or abstracted replacement image representing the image of the undressed user may be placed at a similar position in restored second sensing data in order to remove the private material.

Therefore, embodiments of the present disclosure may protect privacy, minimize the amount of transmitted data, and transmit, to a server, only the information needed for learning and training a data model. Embodiments of the present invention may also learn based on failure cases, thereby considerably enhancing the performance of a recognition model.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The AI unit 130 and/or AI unit 230 may be implemented as one or more processors.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An artificial intelligence (AI) terminal comprising:
a communication unit configured to communicate with an AI device; and
an AI unit configured to:
receive feature data from the AI device, wherein the received feature data is generated by the AI device by obtaining sensing data and compressing the sensing data while preserving a feature of the sensing data; and
input the received feature data to a deep learning model to obtain second sensing data for use in a recognition model related to an AI function of the AI device,
wherein the second sensing data includes a representation of the feature along with the compressed sensing data.

2. The AI terminal of claim 1, wherein:
the AI function is related to voice recognition at the AI device; and
the feature includes at least one of an intonation of speech, a speed of speech, or a gender of a speaker associated with the voice.

3. The AI terminal of claim 1, wherein the AI unit is further configured use the second sensing data to train the recognition model for performing the AI function and transmit the trained recognition model to the AI device.

4. The AI terminal of claim 3, wherein the feature data is received from the AI device when the AI device fails to perform the AI function using the sensing data.

5. The AI terminal of claim 1, wherein:
an encoder of a variational auto-encoder is used to compress the sensing data, and
the deep learning model is a decoder of the variational auto-encoder.

6. The AI terminal of claim 1, wherein the deep learning model is a generator of a generative adversarial network (GAN).

7. The AI terminal of claim 1, wherein the deep learning model is configured to generate the second sensing data using the feature data and data stored in a database which is determined to have a similarity with the feature.

8. The AI terminal of claim 1, wherein:
the AI function is related to image recognition for autonomous movement of the AI device, and
the feature includes at least one of an illuminance of an image, a position of an object depicted in the image, a color of the object, a shape of the object, a directional position of the object, or a relative positioning between the object and a background of the image.

9. A computer-implemented method, the method comprising:
receiving feature data from an AI device, wherein the received feature data is generated by the AI device by obtaining sensing data and compressing the sensing data while preserving a feature of the sensing data; and
inputting the received feature data to a deep learning model to obtain second sensing data for use in a recognition model related to an AI function of the AI device,
wherein the second sensing data includes a representation of the feature along with the compressed sensing data.

10. The method of claim 9, wherein:
the AI function is related to image recognition for autonomous movement of the AI device, and
the feature includes at least one of an illuminance of an image, a position of an object depicted in the image, a color of the object, a shape of the object, a directional position of the object, or a relative positioning between the object and a background of the image.

11. The method of claim 9, wherein:
the AI function is related to voice recognition at the AI device, and
the feature includes at least one of an intonation of speech, a speed of speech, or a gender of a speaker associated with the voice.

12. The method of claim 9, further comprising:
using the second sensing data to train the recognition model for performing the AI function; and
transmitting the trained recognition model to the AI device.

13. The method of claim 12, wherein the feature data is received from the AI device when the AI device fails to perform the AI function using the sensing data.

14. The method of claim 9, wherein:
an encoder of a variational auto-encoder is used to compress the sensing data, and
the deep learning model is a decoder of the variational auto-encoder.

15. The method of claim 9, wherein the deep learning model is a generator of a generative adversarial network (GAN).

16. The method of claim 9, wherein the deep learning model is configured to generate the second sensing data using the feature data and data stored in a database which is determined to have a similarity with the feature.

17. An artificial intelligence (AI) terminal comprising:
a communication unit configured to communicate with an AI device; and
an AI unit configured to:
receive feature data from the AI device, wherein the received feature data is generated by the AI device by obtaining sensing data and compressing the sensing data while preserving a feature of the sensing data; and
input the received feature data to a deep learning model to obtain second sensing data for use in a recognition model related to an AI function of the AI device,
wherein the AI unit is further configured use the second sensing data to train the recognition model for performing the AI function and transmit the trained recognition model to the AI device.

* * * * *